United States Patent [19]

Starzewski

[11] Patent Number: 5,051,286
[45] Date of Patent: Sep. 24, 1991

[54] HIGHLY EFFECTIVE POLARIZERS

[75] Inventor: Karl H. A. O. Starzewski, Bad Vilbel, Fed. Rep. of Germany

[73] Assignee: Bayer Aktiengesellschaft, Leverkusen, Fed. Rep. of Germany

[21] Appl. No.: 446,944

[22] Filed: Dec. 6, 1989

[30] Foreign Application Priority Data

Dec. 21, 1988 [DE] Fed. Rep. of Germany ....... 3842967
Feb. 18, 1989 [DE] Fed. Rep. of Germany ....... 3905027

[51] Int. Cl.$^5$ .......................... G02B 5/30; B32B 27/30
[52] U.S. Cl. ..................................... 428/500; 428/910; 359/490
[58] Field of Search ..................... 428/500, 411.1, 523, 428/424.8, 423.1, 40, 910; 350/398

[56] References Cited

U.S. PATENT DOCUMENTS 4,893,911  1/1990  Starzewski et al. ................ 252/585

Primary Examiner—Alexander S. Thomas
Attorney, Agent, or Firm—Sprung Horn Kramer & Woods

[57] ABSTRACT

Highly effective polarizers are described having a degree of polarization P of at least 95% and a dichroic ratio $Q_E$=quotient of the extinction in the blocking position to the extinction in the transmitting position, of 10 or more over almost the whole wavelength range of visible light between 400 and 800 nm, the said polarizers comprising polymer products containing polyacetylene, in whose matrix 70 to 90% of all comonomer units are vinyl alcohol units. The polarizers are used in the form of films with a stretch ratio $$\epsilon = \frac{l - l_o}{l_o} \cdot 100$$

(l=length after stretching, $l_o$=length before stretching) of more than 300%. They can be produced by polymerization of acetylene in the solution of a copolymer in which 70 to 90% of all comonomer units are vinyl alcohol units, in the presence of a nickel catalyst.

17 Claims, No Drawings

HIGHLY EFFECTIVE POLARIZERS

BACKGROUND OF THE INVENTION

1. Field of the Invention

The invention relates to highly effective polarizers made from polymer products containing polyacetylene, whose matrix is a copolymer in which 70 to 90% of all comonomer units are vinyl alcohol units, the said polarizers having a high dichroic ratio $Q_E$ with a simultaneously very high degree of polarization P. Polarizers of this type are used as film.

2. Description of the Related Art

The production of polarizing films based on polyvinyl alcohol and iodine is disclosed for example in DD 210,342. In this instance, a polyvinyl alcohol film is subsequently coloured. In order to obtain results which are in any way satisfactory, a complicated production and post-treatment process is necessary. Nevertheless, as a rule only a portion of the film obtained in this manner is usable. In practice, the production of polarizing films of this type is limited to iodine and additionally only a few substances with highly effective dichroic behaviour, which limits the applicability of the said films.

Furthermore, EP 249,019 discloses improved polarizers based on polyacetylene bonded to polymer matrices. The films obtained therefrom already exhibit a good optical quality. Thus, for example, after the polymerization of acetylene in a solution of polyvinyl alcohol in DMF, a polarizing film is obtained which has a light polarizing effect of more than 90% after 4-fold stretching.

However, these films disclosed in the EP patent application mentioned still do not have a dichroic ratio which is sufficiently high for "high tech" applications, this ratio being defined as the quotient $Q_E$ of the extinction in the blocking position to the extinction in the transmitting position. The film mentioned in the exemplary embodiment of the EP patent application mentioned is reddish-brown coloured.

SUMMARY OF THE INVENTION

Highly effective polarizers in the form of stretched films have now been found, made from polymer products containing polyacetylene, whose matrix is a copolymer in which 70 to 90% of all comonomer units are vinyl alcohol units, the said polarizers having a maximum degree of polarization P of at least 95% and a dichroic ratio $Q_E$, where $Q_E$=quotient of the extinction in the blocking position to the extinction in the transmitting position= 10 or more over almost the whole wavelength range of visible light from 400 to 800 nm.

The polarizing effect continues in the near IR and UV region.

DETAILED DESCRIPTION OF THE INVENTION

Polarizers of this type are used as films in which a preferred direction is produced by stretching. It has furthermore been found that the high effectiveness of the polarizers according to the invention can be improved at relatively high stretch ratios. The polarizers according to the invention have a stretch ratio $\epsilon$ of more than 300%, preferably at least 500%, particularly preferably at least 600%. Here, the stretch ratio $\epsilon$ is defined by the quotient $$\epsilon = \frac{l - l_o}{l_o} \cdot 100$$

in which $l$ is the length after stretching and $l_o$ is the length before stretching.

In addition to the dichroic ratio $Q_E$=10 or more, the highly effective polarizers according to the invention additionally have a high maximum degree of polarization P of at least 95%, preferably at least 98%, particularly preferably at least 99%. The maximum values of $Q_E$ attain values of 15 and above, preferably 20 and above.

Here, the degree of polarization P is given by the relationship between the transmission of linearly polarized light in the transmitting position and the blocking position respectively (Transmiss. Trans and Transmiss. Block respectively):

$$P = \frac{\text{Transmiss. trans.} - \text{Transmiss. block}}{\text{Transmiss. trans.} + \text{Transmiss. block}} \cdot 100$$

The dichroic ratio $Q_E$ is defined as the quotient of the extinction in the blocking position to the extinction in the transmitting position. This ratio applies to a certain wavelength and is limited in the case of suitable dichroic dyes to a narrow wavelength range of visible light. This is discernible from the inherent colour of polarizers produced with the aid of dichroic dyes; moreover, the materials mentioned are difficult to distribute uniformly over a relatively large surface of a film which is to be coloured with the materials.

On the other hand, the polarizers according to the invention exhibit a high $Q_E$ value over almost the whole range of visible light and are therefore substantially colour-neutral, which is discernible from their inherent grey colour. This corresponds to the desire to have available colour-neutral polarizers with a high light-/dark contrast. This is important for optical communication devices, such as LCDs with externally or internally located polarizing film, in which high resolution and good legibility are desired.

The highly effective polarizers according to the invention may be produced by polymerization of acetylene in the solution of a copolymer in which 70 to 90% of all comonomer units are vinyl alcohol units, in the presence of a nickel catalyst which is obtained by reacting a nickel (0) compound or a compound which can be converted in situ into a nickel (0) compound, with phosphorus compounds of the formulae

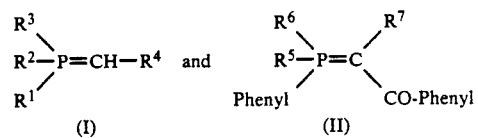

in which

R$^1$, R$^2$ and R$^3$ independently of each other denote C$_1$–C$_8$-alkyl, phenyl or benzyl, R$^4$ represents hydrogen, C$_1$–C$_8$-alkyl or phenyl and R$^5$, R$^6$ and R$^7$ independently of each other denote C$_1$–C$_8$-alkyl or phenyl, and R$^7$ may additionally denote hydrogen or acyl, or in the presence of nickel catalysts which can be produced by reacting a nickel (0) compound or a compound which can be converted in situ into a nickel (0) compound, with an adduct or a mixture of p-benzoquinone and a phosphine of the formula

in which $R^5$ and $R^6$ have the given meaning, and with a compound of the formula (I).

These polymers are processed into films, which are stretched.

Preferably, the acetylene polymerization is carried out in the presence of nickel catalysts which can be prepared by reacting a nickel (0) compound or a compound which can be converted in situ into a nickel (0) compound, with compounds of the formulae

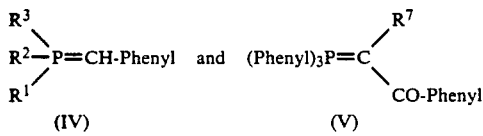

in which $R^1$, $R^2$, $R^3$ and $R^7$ have the meaning given above, or in the presence of nickel catalysts which can be prepared by reacting a nickel (0) compound or a compound which can be converted in situ into a nickel (0) compound, with an adduct or mixture of p-benzoquinone and triphenylphosphine and with a compound of the formula (IV).

In order to prepare the catalyst 1-4 mol of the compound of the formula (I) or (IV) and 1-4 mol of the compound of the formula (II) or (V), are used per mol of nickel (0) compound, and preferably about 1 mol of the compound of the formula (I) or (IV) and about 1 mol of the compound of the formula (II) or (V) are used per mol of the nickel (0) compound. Identical ratios are applied, if a p-benzoquinone/phosphine adduct or a p-benzoquinone/phosphine mixture of the type described replaces a compound of the formula (II) or (V).

The temperature for preparing the catalyst is 0° to 100° C., preferably 20° to 70° C. The preparation is carried out with the exclusion of oxygen, preferably in a solvent, which must be inert towards the reactants, such as benzene, toluene, cyclohexane or n-hexane. After being prepared, the catalyst is normally isolated as a solid by filtration, the solution being concentrated and/or cooled beforehand as required. The catalyst may however also be used directly for the polymerization of acetylene without being isolated i.e. as a solution.

Examples of nickel (0) compounds which may be mentioned are Ni(cyclooctadiene)$_2$ and Ni(allyl)$_2$. The following may be mentioned by way of example as nickel compounds which can be converted in situ into nickel (0) compounds: Ni acetylacetonate, Ni octanoate and Ni stearate, which can be reduced with the aid of customary reducing agents, such as borohydride, aluminium hydride, aluminium alkyls or organolithium compounds.

The following may be mentioned as examples of $C_1$-$C_8$-alkyl, which may be straight-chain or branched: methyl, ethyl, propyl, isopropyl, butyl, isobutyl, tert-butyl, and the isomeric amyls, hexyls and octyls. A preferred alkyl has 1-4 carbon atoms.

As acyl, $C_1$-$C_8$-alkylcarbonyl or phenylcarbonyl may be mentioned, such as acetyl, propionyl, butyryl, $C_5$-alkyl-carbonyl, $C_8$-alkyl-carbonyl, benzoyl or substituted benzoyl. A preferred acyl is substituted or unsubstituted $C_1$-$C_4$-alkylcarbonyl or benzoyl. Acetyl and benzoyl are particularly preferred.

Alkyl, phenyl and benzyl may be mono- to trisubstituted, preferably mono or disubstituted, particularly preferably monosubstituted by $C_1$-$C_4$-alkyl, by $C_1$-$C_4$-alkoxy, by phenyl or phenoxy, and in the case of multiple substitution, the substituents may be taken variously from the given list.

The amount of nickel catalyst used for the acetylene polymerization is not critical. Typical catalyst concentrations are $10^{-1}$ to $10^{-5}$, preferably $10^{-2}$-$10^{-4}$ mol, particularly preferably $1 \times 10^{-3}$ to $5 \times 10^{-3}$ mol of nickel catalyst per liter of polymerization mixture.

The polymerization of the acetylene may be carried out both continuously and discontinuously. Here, a temperature of 20°-120° C., preferably 40° to 110° C., particularly preferably 50°-90° C. is maintained.

The polymerization can be carried out at normal pressure, but it is also possible to polymerize under increased pressure, for example at 1.01 to 20 bar, optionally as a mixture with an inert gas, such as $N_2$. The acetylene can be taken from a pressure bottle and used without further purification. In the case of catalysts which are sensitive to acetone it may be necessary to freeze out beforehand any acetone contained in the acetylene in a cold trap.

The acetylene polymerization is carried out in the solution of a copolymer in which 70 to 90% of all comonomer units are vinyl alcohol units and which may be present in a predominantly tactic or atactic form. The remaining 30 to 10% of all comonomer units may for example be ethylene units and/or vinyl acetate units and/or vinyl trifluoroacetate units and/or units of other copolymerizable olefinic monomers. The preparation of copolymers of this type is known to those skilled in the art and can for example be carried out in such a way that an ethylene-vinyl acetate (trifluoroacetate) copolymer or a vinyl acetate (trifluoroacetate) homopolymer or another suitable copolymer, which contains monomer units which are convertible into vinyl alcohol units, is saponified or converted up to the given content of free vinyl alcohol units.

Examples of solvents for the polymerization are dimethylformamide (DMF), dimethyl sulphoxide (DMSO), dimethylacetamide and so on. The concentration of the polymer in the solvent is 1-20% by weight, preferably 2-10% by weight.

The polymerization medium (solution of the copolymer) may contain water in the percentage range 0.001 to 5% by weight, for example, without the catalyst being deactivated. Water of this type may be introduced via the solvent, via the copolymer or via both solvent and copolymer. The $H_2O$ content is preferably however as low as possible and particularly preferably approaches the value zero.

In order to produce the highly effective polarizers according to the invention the polymerization of acetylene is carried out in a period of 5-1000 sec., preferably 5-600 sec. A particular advantage lies in the possibility of carrying out the reaction in a very short time, for example in 5-300 sec., preferably 5-200 sec. Such very short times are for example to be used when a very thin layer of the polymer solution containing the catalyst is treated with the acetylene.

The solutions of polymer products containing polyacetylene which can be obtained in this manner exhibit a blue colour, which is also retained in the solid polymer product containing polyacetylene after evaporation of the solvent. It is surprising that the blue colour provides a simply recognizable external indication of the high effectiveness of the polarizers according to the invention.

The properties of the polymer products containing polyacetylene are consistent with a structural model, in which lateral branches of polyacetylene are grafted onto the polymer matrix.

The polarizers according to the invention are produced in the form of films by casting or extrusion, and these films are subsequently stretched. For casting, the polymerization solution can be used directly in a manner known to those skilled in the art. For this purpose, polymer solutions containing polyacetylene may also be blended with initial polymer solutions not containing any polyacetylene or with other polymer solutions containing polyacetylene.

Depending on polymerization parameters such as time, temperature, catalyst composition and so on, particularly however on the catalyst composition, the maximum $Q_E$ values mentioned above can occur in different ranges of visible light. It may be desirable to widen the range of the maximum $Q_E$ value by using more than one catalyst for the polymerization and thus producing several $Q_E$ maxima. An identical effect is achieved in principle by blending polymer solutions or precipitated polymers which have been prepared using different polymerization parameters.

The polarizing film may also be obtained however, by stretching a coagulated film. In this case, after the casting process the solvent is not removed by evaporation (at room temperature or elevated temperature and/or reduced pressure) but is removed by contact with a precipitating agent into which the solvent of the polymerization (casting) solution diffuses, only the generally more readily volatile precipitating agent having subsequently to be evaporated.

Examples of precipitating agents are toluene, cyclohexane, acetone, methanol, ethanol and others, in which partially saponified PVAC is not soluble.

However, the polymer product containing polyacetylene may also be precipitated from the polymerization solution with one of the precipitating agents mentioned and isolated as a solid in the customary manner.

The solid polymer product containing polyacetylene is again soluble in one of the solvents mentioned for the polymerization or in water and can be cast into films from a solution of this type. It may be desirable to add a plasticizer known to those skilled in the art to the casting solution. Examples of customary and suitable plasticizers which may be used are glycerol or ethylene glycol in customary amounts, such as about 1–50%, relative to the polymer. Additives of this kind are particularly advantageous when the polymer product containing polyacetylene which has been precipitated is processed from an aqueous casting solution.

The polarizers according to the invention may be processed into laminates by applying adhesive layers and covering layers on one or both sides and are protected in this form from mechanical and chemical damage. The degree of order of a stretched polarizing film is not disturbed by the lamination process. The invention therefore relates also to this particular embodiment of the polarizers described.

While in the case of many laminates, mechanical properties such as strength, energy absorption characteristics (safety glasses) and generally an adequate adhesion of the laminate components is of prime concern, in the case of the lamination of the highly effective polarizers according to the invention there are additionally other requirements, namely 1) a high light transparency, whereby all clouding phenomena must be excluded,
2) a high degree of light fastness
3) protection of the polarizing core layer from chemical influences from the environment and
4) compatibility of the adhesive layers and optionally of the outer layers with the polarizing core layer without impairment of the optical properties.

Examples of suitable outer layers are aromatic polyesters, polyacrylonitriles, poly(meth)acrylates, polysulphones, aromatic polycarbonates, cellulose acetates, cellulose acetate butyrates, polyamides, polyhydantoins, polyimides, polyamidimides, polyparaphenylenebenzo-bisimidazoles and -oxazoles, polyether ketones and mineral glasses, where in particular the polyesters, polyacrylates, polycarbonates, cellulose esters and mineral glasses may be mentioned. The transparency of these materials is their most important feature. They are generally used as thin sheets or as films.

Suitable adhesive layers are thin layers of adhesive materials which do not impair the optical properties of the total laminate which are suitable for bonding the core layer and the outer layers with adequate adhesive strength and which furthermore cause no undesired change in the outer layers and in the polarizing core layer, particularly in the polarizing core layer. Solvent-free systems or solvent-containing systems are suitable for this purpose. The requirement that no chemical changes within the outer layers and within the polarizing core layer should be caused, is particularly important in the case of solvent-containing systems.

The following may be mentioned as adhesive materials of this type which are known in principle to those skilled in the art: epoxy resins which are cured with amines, acid anhydrides or polyamides; acrylate systems, which may be monomeric and oligomeric systems with vinyl groups, which may be cured thermally, photochemically or by free-radicals after the application of the outer layer; mixtures of polyacrylates with phenolic resins, which are applied in solution; isocyanate adhesives and polyurethanes.

The adhesive materials which are to be used as adhesive layers may for example be applied by pouring a solution of this adhesive material onto the polarizing core layer and evaporating the solvent. The polarizing core layer which has been thus provided on one or both sides with adhesive layers can then be bonded with the outer layers.

It is likewise possible to carry out the procedure the other way round by which adhesive material is initially applied to the outer layer(s), after which joining of the outer layers, provided with adhesive coats, to the polarizing core layer, is carried out. The thickness of the individual layers may be adjusted within extraordinarily wide limits and is not critical to the invention. Thicknesses which may be mentioned are from 0.5 to 50 $\mu$m, preferably 0.5 to 20 $\mu$m, for the adhesive layers and thicknesses of 5 $\mu$m to 1 mm, preferably 5 to 100 $\mu$m, for the outer layers. Where outer layers are concerned, however, these may be optical lenses or prisms with greater thicknesses. The core layer may be 1 to 100 μm, preferably 5 to 50 μm thick.

The polarizing film according to the invention and also the adhesive layers or outer layers may furthermore be stabilized with stabilizers known to those skilled in the art, such as UV-absorbers, HALS types and radical interceptors against UV radiation, chemical or heat degradation; typical stabilizers for this purpose which may be mentioned are Ionol ® and Bayer UV 340 ®, which however may be supplemented or replaced by many other stabilizers. No reduction of the optical quality of the polarizing film occurs when this is done.

EXAMPLE 1

Preparation of catalyst 5 mmol of bis-cyclooctadiene-nickel (0) in 100 ml of toluene saturated with dry nitrogen were mixed under nitrogen with 5 mmol of benzoylmethylene-triphenylphosphorane and 5 mmol of methylene-trimethylphosphorane. The mixture was heated with vigorous stirring for about 1 hour at 40°–60° C. The dark yellowish-brown solution was filtered and concentrated to dryness in vacuo. The yellow catalyst was dissolved in 25 ml of dry dimethylformamide saturated with nitrogen. This solution or a portion thereof was used in the subsequent polymerization of acetylene.

EXAMPLE 2

Polyvinyl alcohol-polyacetylene (PVA-PAC)

5 g of polyvinyl alcohol (PVA; degree of saponification of the polyvinyl acetate 88%) were dissolved under inert gas in 245 g of dry DMF (degassed, $N_2$-saturated) at 120° C. in a 250 ml reaction flask (gas feed, dropping funnel without pressure compensation with $N_2$-feed, stirrer, internal thermometer, reflux condenser with bubble gauge), and then brought to a temperature of 80° C. 1.0 mmol of the catalyst described above was then admixed with stirring to 5 ml of DMF under $N_2$ and a uniform stream of acetylene gas (dry ice/acetone) was introduced for 15 sec. The reaction solution was then filtered through a polyamide cloth having a mesh width of 200 μm.

The clear blue PVA-PAC solution (absorption maximum 633 nm) was applied hot with a doctor blade to a PET film as a 400 μm layer. After evaporation of the solvent, a clear, dark blue film was obtained, which was pulled off the base and stretched at about 130° C. to $\epsilon = 760\%$.

The stretched, transparent, light grey film had a degree of polarization of 99.4% at 600 nm.

$Q_E^{max} = 26.3$
$Q_E \geqq 20$ at 580–730 nm
$Q_E \geqq 10$ at 440–780 nm
$P \geqq 95\%$ at 460–700 nm.

EXAMPLES 3–5

Other catalysts were prepared analogously to Example 1. Their ligands, the polymerization conditions and the properties of the polarizing films obtained are shown in the following table.

TABLE

| Examples 3-5, Production and properties of polarizing films | | | | | |
|---|---|---|---|---|---|
| | | Amount of catalyst per | PVA concentration | Polymerization | |
| Example No. | Catalyst | 5 g of PVA (mmol) | in DMF % | Temp. °C. | Time sec. |
| 3 | NiPh($Ph_2$PCHCPhO) ($Me_3PCH_2$) | 0.5 | 5 | 80 | 15 |
| 4 | NiPh($Ph_2$PCHCPhO) ($Me_3PCH_2$) | 0.375 | 7.5 | 80 | 15 |
| 5 | NiPh($Ph_2$PCHCPhO) ($Pr^i_3$PCHPh) | 0.25 | 5 | 80 | 15 |

| Example No. | 1st absorption maximum of the reactn. soln. λ/nm | Stretch ratio ε% | $Q_\epsilon \geqq 10$ in the wavelength range nm | $Q_\epsilon$ max | $P \geqq 95\%$ in the wavelength range nm | $P_{max}$ % |
|---|---|---|---|---|---|---|
| 3 | 602 | 732 | 440–750 | 19.0 | 350–700 | 99.7 |
| 4 | 625 | 746 | 500–800 | 19.9 | 350–700 | 99.8 |
| 5 | 637 | 720 | 450–750 | 25.4 | 400–700 | 99.8 |

Me = methyl,
$Pr^i$ = isopropyl,
Ph = phenyl

What is claimed is:

1. A highly effective polarizer in the form of a stretched film, made from a polymer product containing polyacetylene, whose matrix is a copolymer in which 70 to 90% of all comonomer units are vinyl alcohol units, the said polarizer having a maximum degree of polarization P of at least 95% and a dichroic ratio $Q_E$, where $Q_E$ = quotient of the extinction in the blocking position to the extinction in the transmitting position = 10 or more over almost the whole wavelength range of visible light from 400 to 800 nm.

2. The polarizer of claim 1, wherein the polarizing effect continues in the near IR and UV region.

3. The polarizer of claim 1 with a stretch ratio ε of more than 300%.

4. The polarizer of claim 3 with a stretch ratio ε of at least 500%.

5. The polarizer of claim 4 with a stretch ration ε of at least 600%.

6. The polarizer of claim 1 with a maximum degree of polarization P of at least 98% and a maximum $Q_E$ value of 15 and above.

7. The polarizer of claim 6 with a maximum degree of polarization P of at least 99%.

8. The polarizer of claim 7 with a maximum $Q_E$ value of 20 and above.

9. A highly effective polarizer in the form of a stretched film comprising a polymer produced by polymerization of acetylene at 20°–120° C. during a period of 5–1000 sec. in the solution of a copolymer in which 70 to 90% of all comonomer units are vinyl alcohol units, in the presence of a nickel catalyst which is obtained by reacting a nickel (0) compound or a compound which can be converted in situ into a nickel (0) compound, with phosphorus compounds of the formulae

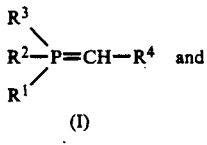 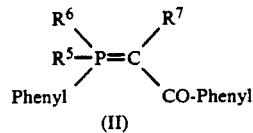

in which
R$^1$, R$^2$ and R$^3$ independently of each other denote C$_1$-C$_8$-alkyl, phenyl or benzyl,
R$^4$ represents hydrogen, C$_1$-C$_8$-alkyl or phenyl and
R$^5$, R$^6$ and R$^7$ independently of each other denote C$_1$-C$_8$-alkyl or phenyl, and R$^7$ may additionally denote hydrogen or acyl, or in the presence of nickel catalysts which can be produced by reacting a nickel (0) compound or a compound which can be converted in situ into a nickel (0) compound, with an adduct or a mixture of p-benzoquinone and a phosphine of the formula

in which R$^5$ and R$^6$ have the given meaning, and with a compound of the formula (I), by processing the polymer into a film and by stretching the said film.

10. The polarizer of claim 9, wherein polymerization is carried out in the presence of a nickel catalyst which is obtained by reacting a nickel (0) compound with phosphorus compounds of the formulae

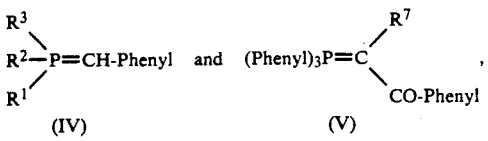

in which
R$^1$, R$^2$, R$^3$ and R$^7$ have the meaning given in claim 9, or in the presence of nickel catalysts which can be prepared by reacting a nickel (0) compound or a compound which can be converted in situ into a nickel (0) compound, with an adduct or mixture of p-benzoquinone and triphenylphosphine and with a compound of the formula (IV).

11. The polarizer of claim 9, which has a stretch ratio $\epsilon$ of more than 300%.

12. The polarizer of claim 11, which has a stretch ratio $\epsilon$ of at least 500%.

13. The polarizer of claim 12, which has a stretch ratio $\epsilon$ of at least 600%.

14. The polarizer of claim 9, which can be produced at a concentration of $10^{-1}$ to $10^{-5}$ mol of Ni catalyst per liter of polymerization mixture.

15. The polarizer of claim 14, which can be produced at a concentration of $10^{-2}$ to $10^{-4}$ mol of Ni catalyst per liter of polymerization mixture.

16. The polarizer of claim 9, for which a duration of 5-300 seconds is used for the polymerization.

17. The polarizer of claim 16, for which a duration of 5-200 seconds is used for polymerization.

* * * * *